(12) United States Patent
Mangla et al.

(10) Patent No.: US 12,689,550 B1
(45) Date of Patent: Jul. 21, 2026

(54) STATEFUL MULTI-NODE HIGH AVAILABILITY

(71) Applicant: Juniper Networks, Inc., Sunnyvale, CA (US)

(72) Inventors: Umesh Mangla, Sunnyvale, CA (US); Xiaodong Zhu, Fremont, CA (US); Dilip H. Sanghavi, San Ramon, CA (US); Avinash Kumar Singh, Fremont, CA (US); Sai Sundar Ramamurthy, Sunnyvale, CA (US); Ashwin M. Kovummal, Newark, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 171 days.

(21) Appl. No.: 18/662,350

(22) Filed: May 13, 2024

(51) Int. Cl.
*H04L 41/0659* (2022.01)

(52) U.S. Cl.
CPC ................................ *H04L 41/0661* (2023.05)

(58) Field of Classification Search
CPC .................................................. H04L 41/0661
See application file for complete search history.

(56) References Cited

U.S. PATENT DOCUMENTS

| | | | |
|---|---|---|---|
| 9,954,783 B1 | 4/2018 | Thirumurthi | |
| 9,985,875 B1 * | 5/2018 | Srinath | ............... G06F 11/3041 |
| 10,250,562 B1 * | 4/2019 | Srinath | ............... H04L 63/0209 |
| 12,489,702 B1 * | 12/2025 | Thangavel | ............ H04L 45/125 |

* cited by examiner

*Primary Examiner* — Kristie D Shingles
(74) *Attorney, Agent, or Firm* — Harrity & Harrity, LLP

(57) ABSTRACT

A first node communicates, via a high availability link, initialization information with a second node and thereby configures the first node as an active node for a first service redundancy group (SRG) and as a backup node for a second SRG. The first node also causes a first ingress floating IP address to be associated with an ingress link of the first node and a first egress floating IP address to be associated with an egress link of the first node, wherein the first ingress floating IP address is associated with the first SRG and the first egress floating IP address is associated with the first SRG. The first node communicates, via the high availability link, SRG state information with the second node and updates a data structure based on the SRG state information.

20 Claims, 16 Drawing Sheets

100 ⟶

110
Configure the first node
112
Cause first floating IP address associations First Ingress Floating IP — First Node — First Egress Floating IP

108
Communicate initialization information ⇕ HA Link

Second Ingress Floating IP — Second Node — Second Egress Floating IP

114
Configure the second node
116
Cause second floating IP associations

| SRG | Active | Backup |
|---|---|---|
| A | First | Second |
| B | Second | First |

106
Create a group of nodes

102
Identify a serverless compute function for creating nodes

104
Cause execution of the serverless compute function

Management and Orchestration System

Group of Nodes 1

First Node

Second Node

Ingress Node

Endpoint Device A

100

136
Determine that the second node is a failed node
138
Reconfigure the first node
140
Cause second floating IP associations to be changed First
Egress
Floating IP Second
Egress
Floating IP First
Node First
Ingress
Floating IP Second
Ingress
Floating IP Second
Node 134
Node failure

100

| SRG | Active | Backup |
|-----|--------|--------|
| A | First | – |
| B | First | – |

152
Delete failed second node and create replacement second node

Management and Orchestration System

146
Identify a failure event

148
Identify a serverless compute function for deleting and creating nodes

150
Cause the serverless compute function to be executed

First Node

Replacement Second Node

Second Node

100

500

510   Cause creation of a group of nodes that includes a first node and a second node 520   Send ingress information 530   Send egress information

600

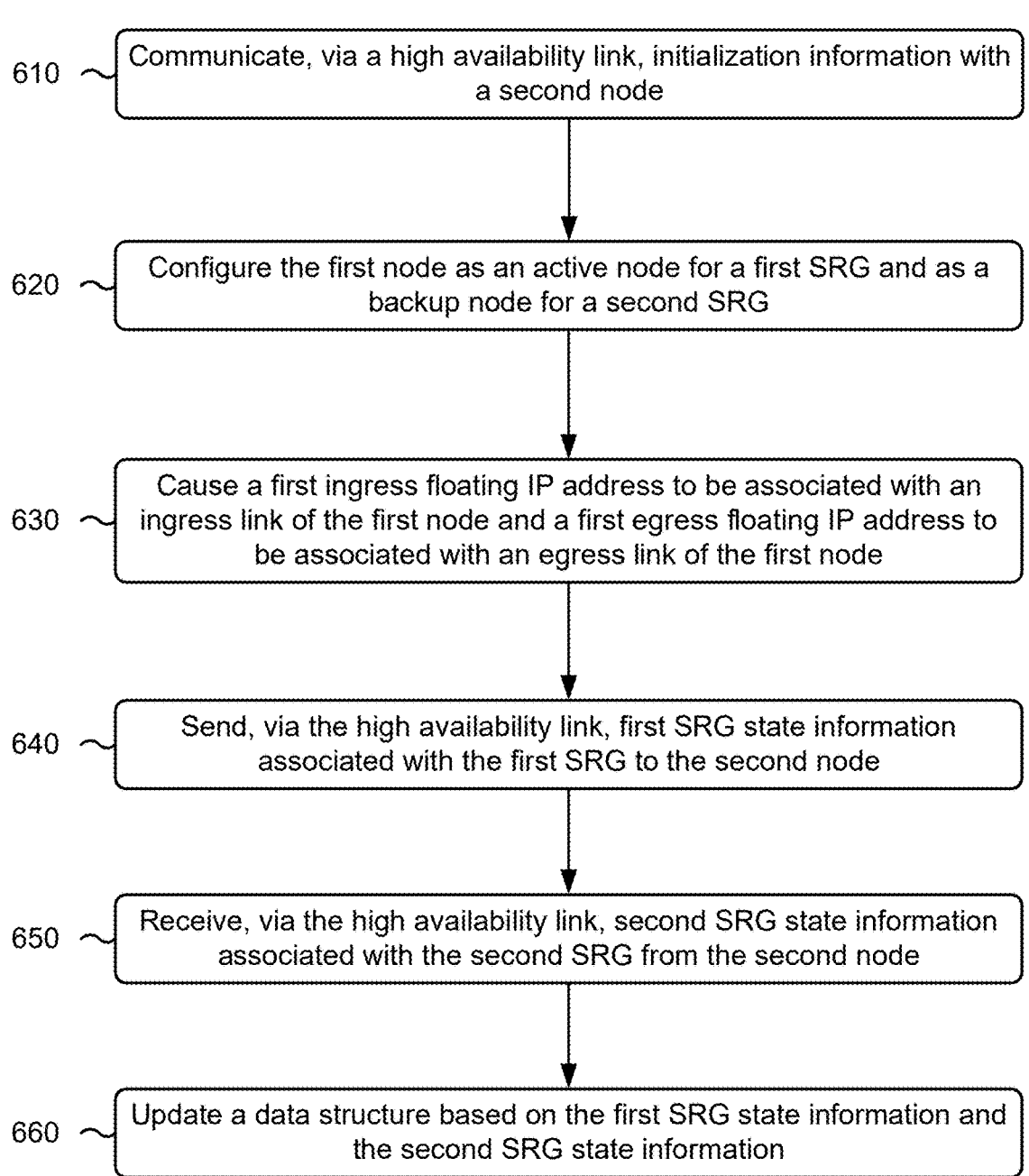

| 610 | Communicate, via a high availability link, initialization information with a second node |
| 620 | Configure the first node as an active node for a first SRG and as a backup node for a second SRG |
| 630 | Cause a first ingress floating IP address to be associated with an ingress link of the first node and a first egress floating IP address to be associated with an egress link of the first node |
| 640 | Send, via the high availability link, first SRG state information associated with the first SRG to the second node |
| 650 | Receive, via the high availability link, second SRG state information associated with the second SRG from the second node |
| 660 | Update a data structure based on the first SRG state information and the second SRG state information |

FIG. 6

STATEFUL MULTI-NODE HIGH AVAILABILITY

BACKGROUND

An ingress node can provide an entry point to a network (e.g., a cloud network). The ingress node can receive incoming traffic and forward the traffic to another node within the network (e.g., to allow a service or functionality to be performed on the traffic).

SUMMARY

In some implementations, a method includes causing, by a system, creation of a group of nodes that includes a first node and a second node, wherein the first node is configured with a first ingress floating Internet protocol (IP) address associated with an ingress link of the first node and a first egress floating IP address associated with an egress link of the first node, and the second node is configured with a second ingress floating IP address associated with an ingress link of the second node and a second egress floating IP address associated with an egress link of the second node, and wherein the first node is configured as an active node for a first service redundancy group (SRG) and as a backup node for a second SRG, and the second node is configured as a backup node for the first SRG and as an active node for the second SRG; sending, by the system, ingress information that indicates that the first ingress floating IP address is associated with the first SRG and that the second ingress floating IP address is associated with the second SRG; and sending, by the system, egress information that indicates that the first egress floating IP address is associated with the first SRG and that the second egress floating IP address is associated with the second SRG.

In some implementations, a first node includes one or more memories; and one or more processors to: communicate, via a high availability link, initialization information with a second node; configure, based on communicating the initialization information with the second node, the first node as an active node for a first SRG and as a backup node for a second SRG; cause, based on communicating the initialization information with the second node, a first ingress floating IP address to be associated with an ingress link of the first node and a first egress floating IP address to be associated with an egress link of the first node, wherein the first ingress floating IP address is associated with the first SRG and the first egress floating IP address is associated with the first SRG; send, via the high availability link, first SRG state information associated with the first SRG to the second node; receive, via the high availability link, second SRG state information associated with the second SRG from the second node; and update a data structure based on the first SRG state information and the second SRG state information.

In some implementations, a non-transitory computer-readable medium storing a set of instructions includes one or more instructions that, when executed by one or more processors of a first node, cause the first node to: configure the first node as an active node for a first SRG and as a backup node for a second SRG; and cause a first ingress floating IP address to be associated with an ingress link of the first node and a first egress floating IP address to be associated with an egress link of the first node, wherein the first ingress floating IP address is associated with the first SRG and the first egress floating IP address is associated with the first SRG.

BRIEF DESCRIPTION OF THE DRAWINGS

FIG. 6 is a flowchart of an example process associated with stateful multi-node high availability.

DETAILED DESCRIPTION

Figure 1A:
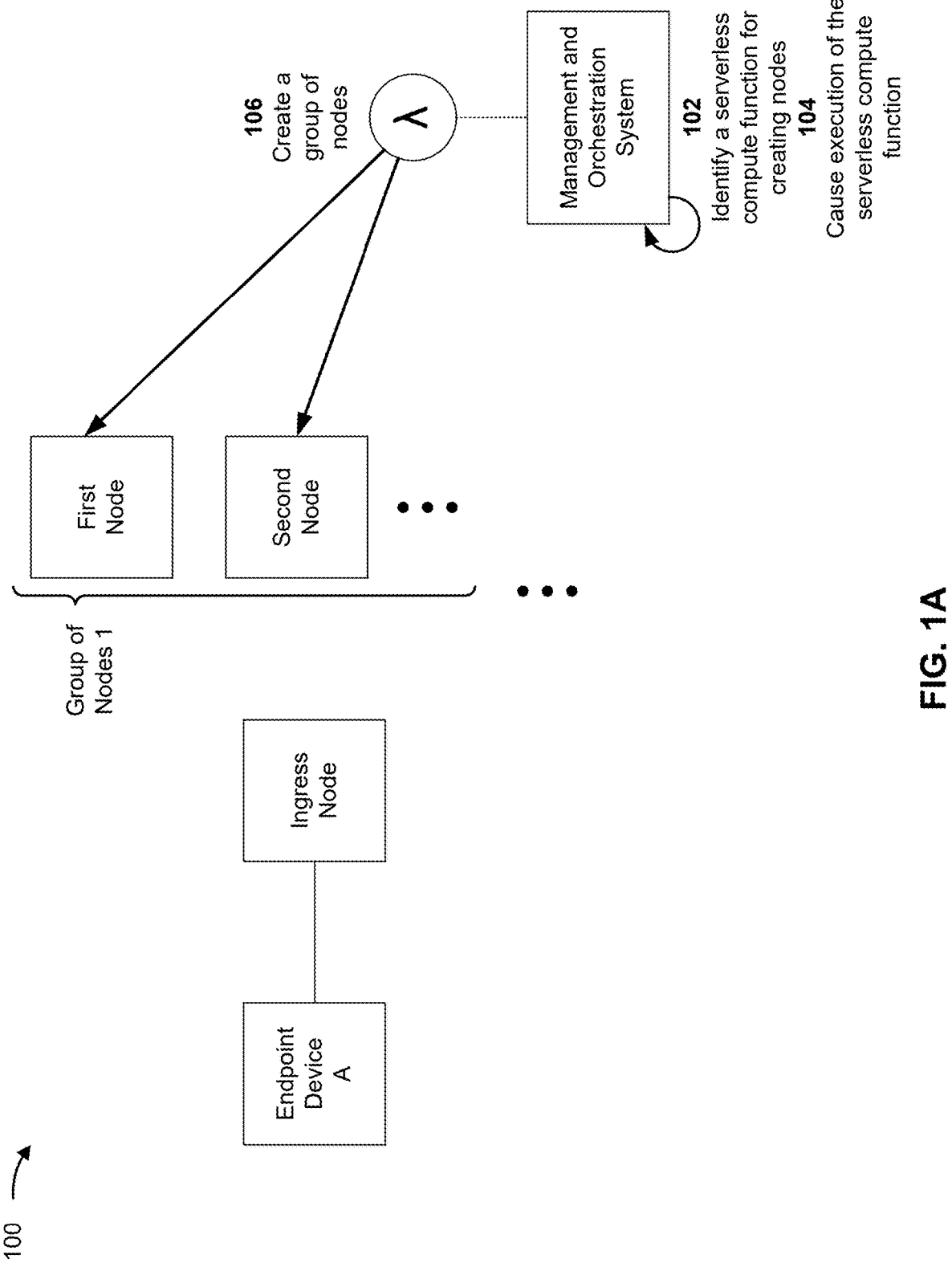
FIGS. 1A-1K are diagrams of an example implementation associated with stateful multi-node high availability.

The following detailed description of example implementations refers to the accompanying drawings. The same reference numbers in different drawings may identify the same or similar elements.

An ingress node associated with a network can receive traffic from a device and can select a node, of a plurality of nodes, to which to forward the traffic. The selected node can, for example, provide one or more security functionalities (e.g., firewall functionalities, packet inspection functionalities, content inspection functionalities, intrusion prevention functionalities, and/or other security functionalities) in association with the traffic. Further, the ingress node can provide a load balancing functionality by distributing incoming traffic across the plurality of nodes to prevent overloading of individual nodes.

However, in many cases, a node, of the plurality of nodes, can fail. Accordingly, any traffic (e.g., any traffic flows) handled by the node are dropped. Additionally, the ingress node needs to use additional computing resources (e.g., processing resources, memory resources, communication resources, and/or power resources, among other examples) to select a different node to handle new traffic (e.g., new traffic flows) that replaces the dropped traffic. This process also takes time to establish, which can impact a performance of a network (e.g., in terms of throughput, latency, and other performance parameters) that includes the ingress node and the plurality of nodes.

Consequently, there is a need for a high availability (sometimes referred to as HA) solution for when a node fails. High availability is generally understood as providing uninterrupted, or only minimally interrupted, access to network resources (even when a node fails), such as by use of node redundancy. For example, in some cases, a backup node can take over for a failed node, but the backup node usually maintains a non-active state such that the backup node's computing resources are idle until the backup node takes over for the failed node.

Some implementations described herein provide a group of nodes that includes at least a first node and a second node. The first node is an active node for a first SRG and the second node is an active node for a second SRG. Further, the first node is a backup node for the second SRG and the second node is a backup node for the first SRG. In this way, both the first node and the second node are active nodes (e.g., configured in an active-active mode), and are also backup nodes (for each other's SRG). Accordingly, both the first node and the second node actively use computing resources, which can improve a utilization efficiency of the nodes (e.g., as compared to one node being in an active state and another node being in an idle, backup state).

Further, in some implementations, floating IP addresses (e.g., an ingress floating IP address and an egress floating IP address) can be associated with each SRG. Accordingly, when either the first node or the second node fails, the floating IP addresses associated with an SRG, for which the failed node was an active node, move to (or "float" to) the backup node. Accordingly, an ingress node (e.g., that is providing a load balancing functionality) can route traffic associated with an SRG according to an ingress floating IP address for the SRG and the ingress floating IP address will float to a backup node, of the first node or the second node, for the SRG that is otherwise able to handle the traffic. Further, the first node and the second node exchange state information (e.g., before a failure event), such that the backup node is able to take over for the failed node without dropping (or with minimal dropping of) the traffic associated with the SRG.

In this way, the first node and the second node provide high availability for traffic associated with the SRG such that the traffic is continuously handled by one of the nodes with minimal disruption. Thus, some implementations improve a performance of a network (e.g., in terms of throughput, latency, and other performance parameters) that comprises the ingress node and the group of nodes that includes the first node and the second node. Accordingly, some implementations described herein provide stateful multi-node high availability (e.g., in a network architecture, such as an advanced network security architecture) for a network (e.g., a cloud network, such as a public cloud network), where all nodes can use all network bandwidth and central processing unit (CPU) resources (e.g., by operating in an active-active mode).

FIGS. 1A-1K are diagrams of an example implementation 100 associated with stateful multi-node high availability (e.g., where multiple nodes are active nodes and are also backup nodes for each other, and the nodes exchange state information to allow for a backup node to take over for a failed node with minimal disruption). As shown in FIGS. 1A-1K, the example implementation 100 includes an endpoint device, a plurality of nodes (shown as a first node and a second node), an ingress node, and a management and orchestration system. These devices are described in more detail below in connection with FIGS. 2-4.

The plurality of nodes and the ingress node may be associated with a network (e.g., an external network, such as a network that is associated with a cloud environment). For example, the plurality of nodes and the ingress node may provide a plurality of security functionalities (e.g., firewall functionalities, packet inspection functionalities, content inspection functionalities, intrusion prevention functionalities, and/or other security functionalities) for traffic that originates from the endpoint device A (and that is destined for the network). Each security functionality may be associated with at least one layer of layers 3 through 7 of an open systems interconnection (OSI) model. In this way, some implementations enable distribution of security functionalities (also referred to as security services) across multiple nodes.

The ingress node may be configured to provide a load balancing functionality across the plurality of nodes. For example, the ingress node may be configured to select a node to which the ingress node is to forward traffic (e.g., from the endpoint device A). In this way, the ingress node may distribute incoming traffic across the plurality of nodes to prevent overloading of individual nodes.

As shown in FIG. 1A, and by reference number 102, the management and orchestration system may identify a serverless compute function (also referred to as a lambda function) for creating nodes. For example, the management and orchestration system may identify the serverless compute function to enable creation (e.g., initial creation) of at least some of the plurality of nodes (e.g., to allow the ingress node to distribute traffic across many different nodes).

In some implementations, the management and orchestration system may monitor the plurality of nodes. For example, the management and orchestration system may monitor a respective load of the plurality of nodes, a collective load of the plurality of nodes, and/or one or more other performance parameters associated with the plurality of nodes. Accordingly, the management and orchestration system may identify the serverless compute perform, such as to enable a scaling operation. For example, the management and orchestration system may determine that the collective load of the plurality of nodes satisfies (e.g., is greater than or equal to) a maximum collective load threshold, and may thereby perform a "scaling up" operation, wherein the management and orchestration system identifies the serverless compute function for creating nodes (and then causes execution of the serverless compute function, as described herein).

As shown by reference number 104, the management and orchestration system may cause execution of the serverless compute function (e.g., based on identifying the serverless compute function). For example, the management and orchestration system may execute code that is associated with the serverless compute function, to cause the serverless compute function to be executed. As an alternative example, the management and orchestration system may communicate with another system or another device to cause the serverless compute function to be executed (e.g., by the other system or the other device).

As shown by reference number 106, the serverless compute function may create a group of nodes (e.g., based on the management and orchestration system causing execution of the serverless compute function). The group of nodes may include two or more nodes. For example, as shown in FIG. 1A, the serverless compute function creates a group of nodes that includes at least a first node and a second node. For simplicity, operations associated with the first node and the second node are described herein, but the operations are applicable to additional nodes when the group includes additional nodes.

In this way, the management and orchestration system may cause creation of the group of nodes that includes the first node and the second node. While FIG. 1A shows one group of nodes (group of nodes 1), the management and orchestration system may cause creation of multiple groups of nodes. For simplicity, operations associated with a single group of nodes are discussed herein, but the operations are applicable to more than one group of nodes.

Figure 1B:
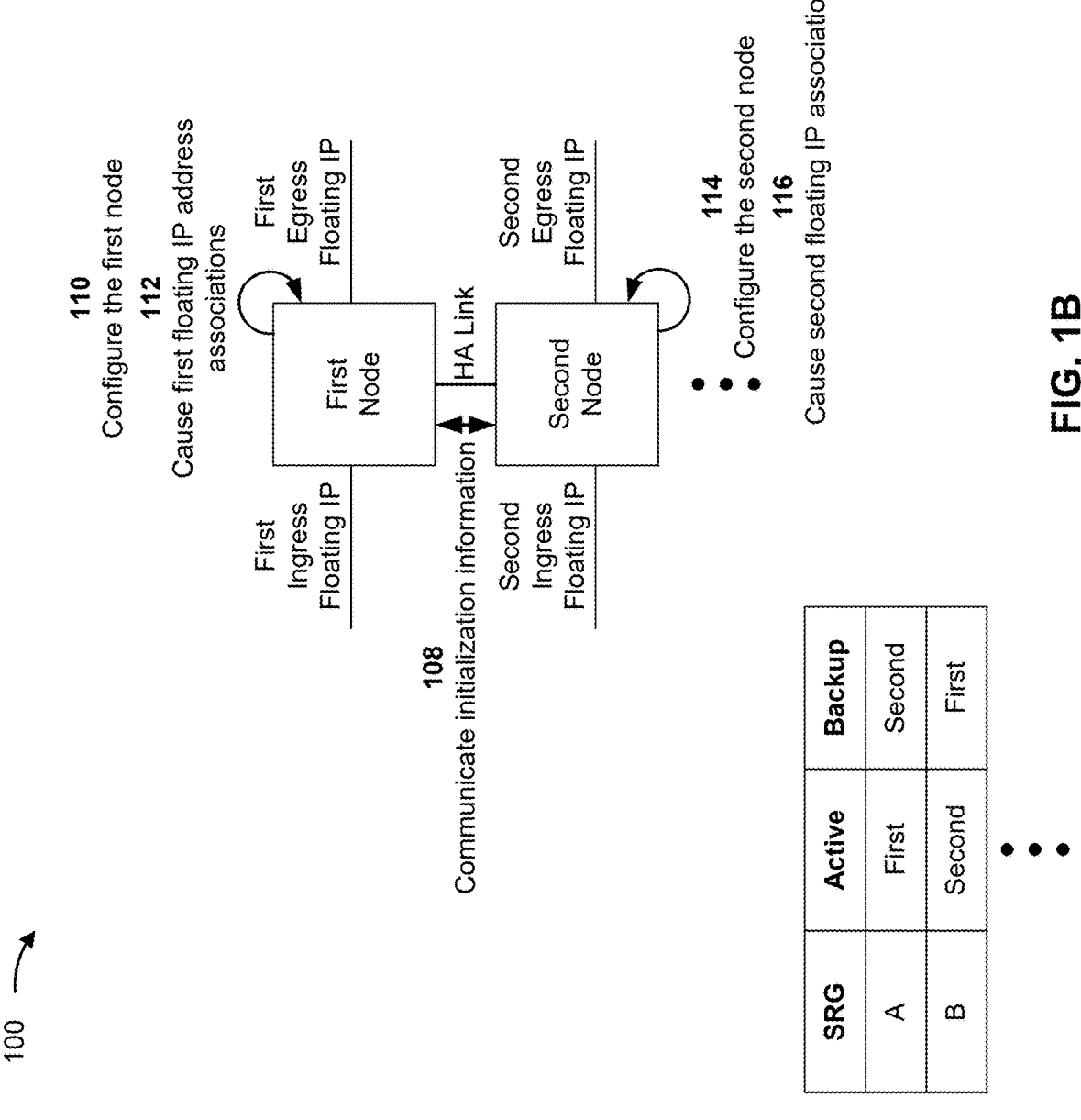

As shown in FIG. 1B, a link (hereinafter referred to as a high availability link or an HA link) may connect the first node and the second node. The high availability link may be configured to allow the first node and the second node to communicate with each other (e.g., to communicate information that enables high availability of one node for the other node, as further described herein).

Accordingly, as shown by reference number 108, the first node and the second node may communicate initialization information (e.g., via the high availability link). For example, the first node (e.g., using a first state management module) may send first initialization information to the second node (e.g., via the high availability link), and the second node (e.g., using a second state management module) may send second initialization information to the first node (e.g., via the high availability link). Communication of the initialization information may enable the first node and the second node to perform one or more other operations described herein in relation to FIG. 1B.

As shown by reference number 110, the first node may configure the first node (e.g., based on communicating the initialization information with the second node). For example, the first node may configure the first node as an active node for a first SRG (e.g., an SRG A) and as a backup node for a second SRG (e.g., an SRG B). As a specific example, the first node may include a first SRG state machine data structure, and the first node may cause the first SRG state machine data structure to indicate that the first node is an active node for the first SRG and is a backup node for the second SRG.

Further, as shown by reference number 112, the first node may cause first floating IP address associations with links of the first node. For example, the first node may have an ingress link (shown as a left link in FIG. 1B), which may be associated with a first ingress primary IP address, and an egress link (shown as a right link in FIG. 1B), which may be associated with a first egress primary IP address. Accordingly, the first node may cause a first ingress floating IP address (e.g., that is associated with the first SRG) to be associated with the ingress link of the first node (e.g., along with the first ingress primary IP address) and a first egress floating IP address (e.g., that is associated with the second SRG) to be associated with the egress link of the first node (e.g., along with the first ingress primary IP address). For example, the first node may update the first SRG state machine data structure to indicate that the first ingress floating IP address is associated with the ingress link of the first node and that the first egress floating IP address is associated with the egress link of the first node. Accordingly, because the first node is the active node for the first SRG, the first ingress floating IP address is associated with the ingress link of the first node and the first egress floating IP address is associated with the egress link of the first node.

As shown by reference number 114, the second node may configure the second node (e.g., based on communicating the initialization information with the first node). For example, the second node may configure the second node as an active node for the second SRG (e.g., the SRG B) and as a backup node for the first SRG (e.g., the SRG A). As a specific example, the second node may include a second SRG state machine data structure, and the second node may cause the second SRG state machine data structure to indicate that the second node is an active node for the second SRG and is a backup node for the first SRG.

Further, as shown by reference number 116, the second node may cause second floating IP address associations with links of the second node. For example, the second node may have an ingress link (shown as a left link in FIG. 1B), which may be associated with a second ingress primary IP address, and an egress link (shown as a right link in FIG. 1B), which may be associated with a second egress primary IP address. Accordingly, the second node may cause a second ingress floating IP address (e.g., that is associated with the second SRG) to be associated with the ingress link of the second node (e.g., along with the second ingress primary IP address) and a second egress floating IP address (e.g., that is associated with the second SRG) to be associated with the egress link of the second node (e.g., along with the second ingress primary IP address). For example, the second node may update the second SRG state machine data structure to indicate that the second ingress floating IP address is associated with the ingress link of the second node and that the second egress floating IP address is associated with the egress link of the second node. Accordingly, because the second node is the active node for the second SRG, the second ingress floating IP address is associated with the ingress link of the second node and the second egress floating IP address is associated with the egress link of the second node.

In this way, as shown by the table in the bottom left corner of FIG. 1B, the first node and the second node may communicate with each other such that the first node is an active node for the first SRG (e.g., SRG A) and the second node is a backup node for the first SRG, and the second node is an active node for the second SRG (e.g., SRG B) and the first node is a backup node for the second SRG. In this way, the first node and the second are configured in an active-active mode.

Figure 1C:
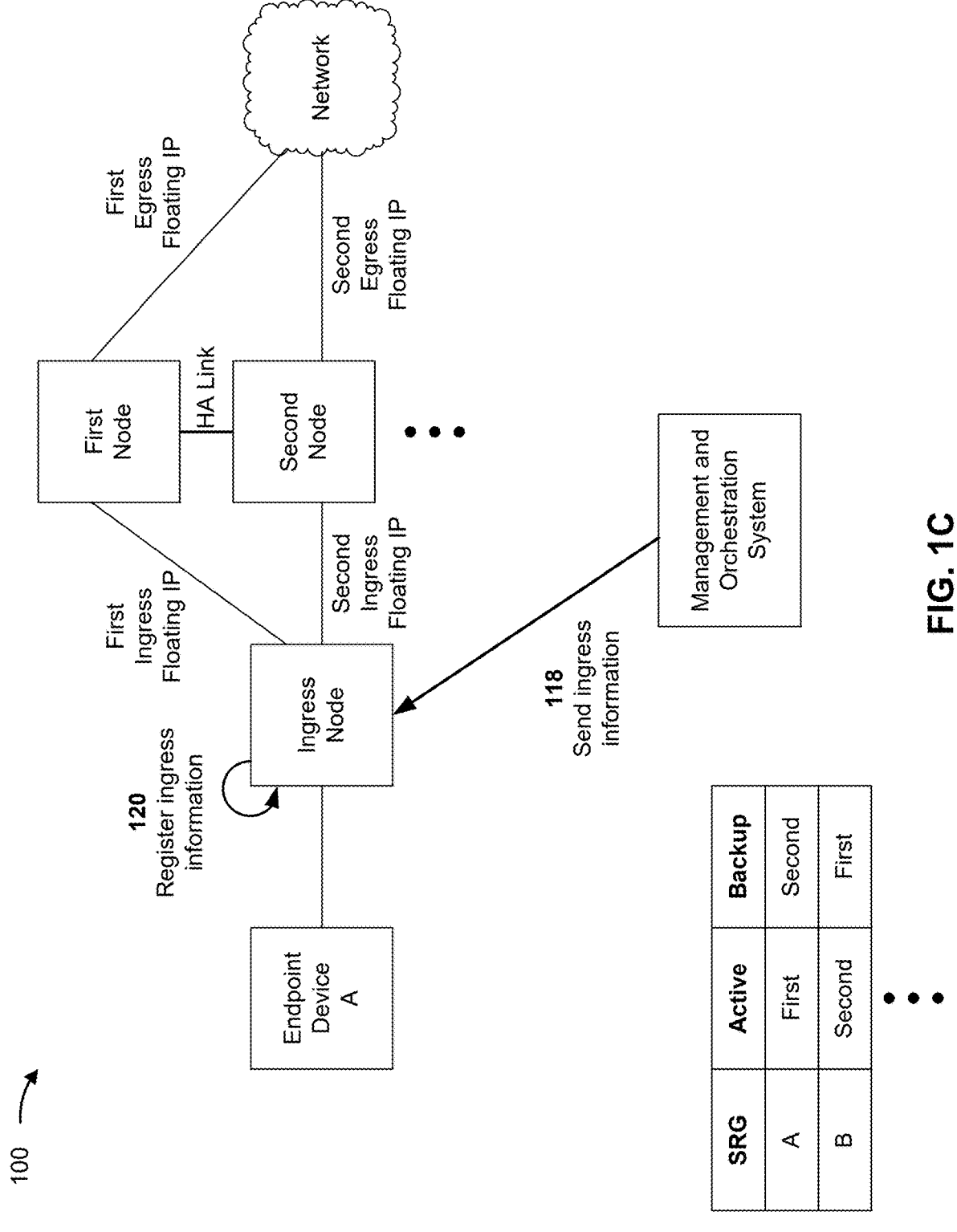

As shown in FIG. 1C, and by reference number 118, the management and orchestration system may send ingress information, such as to the ingress node. The ingress information may indicate the first ingress floating IP address and the second ingress floating IP address (e.g., as associated with intermediary nodes for forwarding traffic destined for the network). In some implementations, at least one of the first node or the second node may provide the ingress information to the management and orchestration system (e.g., as a result of the management and orchestration system causing creation of the group of nodes that include the first node and the second node) to allow the management and orchestration system to send the ingress information. Alternatively, at least one of the first node or the second node may send the ingress information (e.g., without communicating the ingress information to the management and orchestration system).

As shown by reference number 120, the ingress node may register the ingress information. For example, the ingress node may register the first ingress floating IP address and the second ingress floating IP. That is, the ingress node may update a data structure (e.g., a forwarding information base (FIB) or another type of data structure included in and/or accessible to the ingress node) to indicate that traffic (e.g., that is destined for the network) is to be forwarded to the first ingress floating IP address or to the second ingress floating IP address.

Figure 1D:
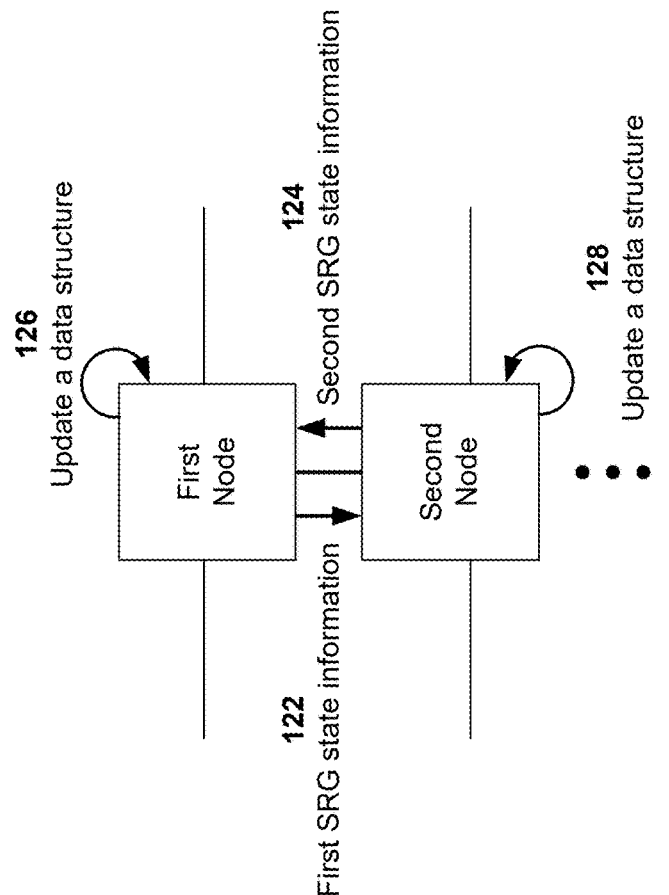

As shown in FIG. 1D, and by reference number 122, the first node (e.g., using a state management module) may send first SRG state information associated with the first SRG. For example, the first node may send the first SRG state information to the second node via the high availability link. The first SRG state information may include information related to traffic (e.g., current traffic flows) associated with the first SRG that the first node is handling.

As shown by reference number 124, the second node (e.g., using a state management module) may send second SRG state information associated with the second SRG. For example, the second node may send the second SRG state information to the first node via the high availability link. The second SRG state information may include information related to traffic (e.g., current traffic flows) associated with the second SRG that the second node is handling.

In some implementations, the first node and the second node may also communicate node health information via the high availability link. For example, the first node may send first health information to the second node via the high availability link. The first health information may indicate that the first node is operating and functioning (e.g., as intended). As another example, the second node may send second health information to the first node via the high availability link. The second health information may indicate that the second node is operating and functioning (e.g., as intended).

As shown by reference number 126, the first node (e.g., using a state management module) may update a data structure. For example, the first node may update the first SRG state machine data structure to include the first SRG state information (e.g., to enable the first node to handle traffic associated with the first SRG as the active node for the first SRG) and the second SRG state information (e.g., to enable the first node to handle traffic associated with the second SRG as a backup node for the second SRG).

As shown by reference number 128, the second node (e.g., using a state management module) may update a data structure. For example, the second node may update the second SRG state machine data structure to include the second SRG state information (e.g., to enable the second node to handle traffic associated with the second SRG as the active node for the second SRG) and the first SRG state information (e.g., to enable the second node to handle traffic associated with the first SRG as the backup node for the first SRG).

In this way, the first node and the second node exchange SRG state information to provide stateful multi-node high availability (e.g., in a network architecture, such as an advanced network security architecture) for the network.

Figure 1E:
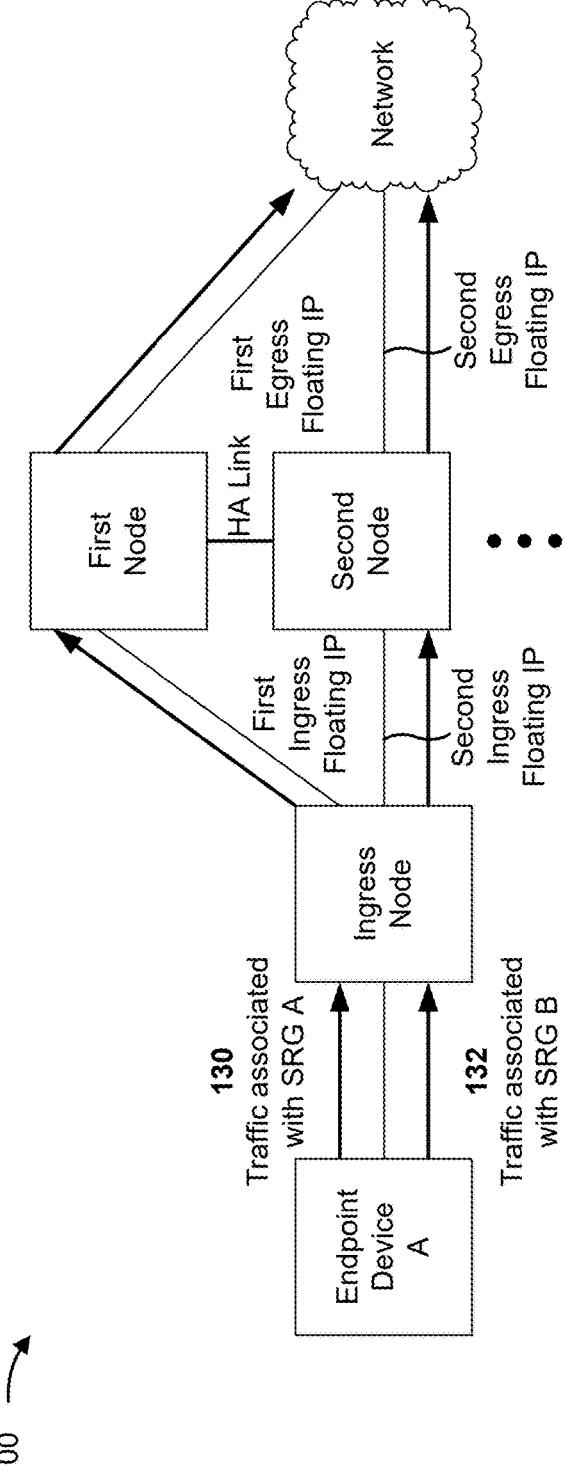

As shown by FIG. 1E, and by reference number 130, the endpoint device A may send traffic associated with the first SRG (SRG A) (e.g., that is destined for the network). Accordingly, the ingress node may receive the traffic (e.g., via an ingress link of the ingress node), determine (e.g., based on the data structure associated with the ingress node) that the traffic is to be forwarded to the first ingress floating IP address (e.g., that is associated with the first node), and may forward (e.g., via an egress link of the ingress node) the traffic to the first ingress floating IP address. The first node may thereby receive the traffic (e.g., via the ingress link of the first node) and may send at least a portion of the traffic (e.g., after performing one or more security functionalities) to the network (e.g., via the egress link of the first node).

As shown by reference number 132, the endpoint device A may send traffic associated with the second SRG (SRG B) (e.g., that is destined for the network). Accordingly, the ingress node may receive the traffic (e.g., via an ingress link of the ingress node), determine (e.g., based on the data structure associated with the ingress node) that the traffic is to be forwarded to the second ingress floating IP address (e.g., that is associated with the second node), and may forward (e.g., via an egress link of the ingress node) the traffic to the second ingress floating IP address. The second node may thereby receive the traffic (e.g., via the ingress link of the second node) and may send at least a portion of the traffic (e.g., after performing one or more security functionalities) to the network (e.g., via the egress link of the second node).

Figure 1F:
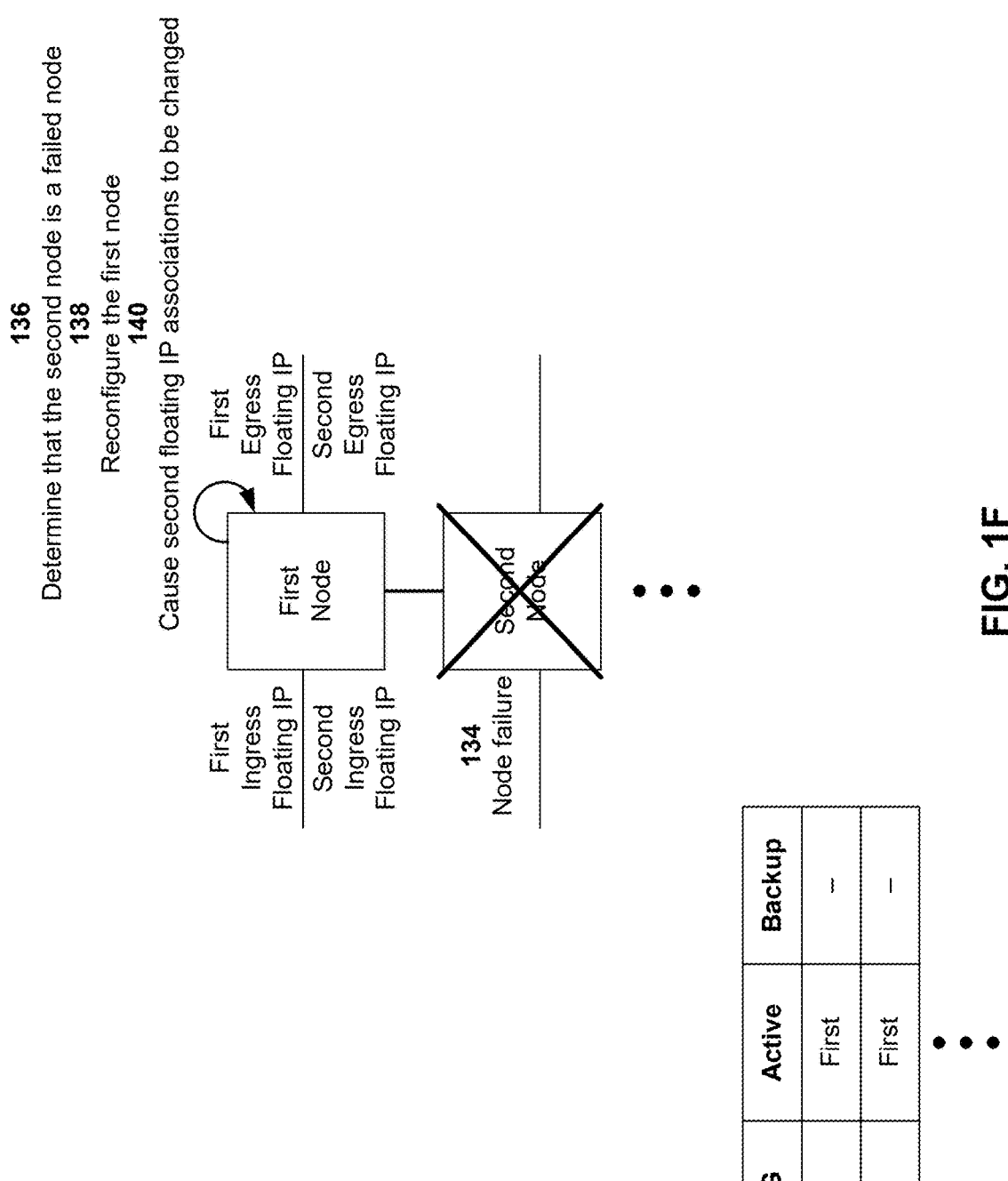

As shown in FIG. 1F, and by reference number 134, the second node may fail. For example, the second node may go offline, may cease to operate, or may otherwise not function as intended. Consequently, the second node may no longer be able to handle traffic associated with the second SRG (SRG B).

As shown by reference number 136, the first node may determine that the second node is a failed node. For example, the first node may communicate, via the high availability link, node health information with the second node (e.g., as elsewhere described herein). The first node may thereby determine that the second node is a failed node (e.g., based on at least some of the node health information indicating that the second node is a failed node and/or based on the second node ceasing to provide node health information).

Accordingly, as shown by reference number 138, the first node may reconfigure the first node (e.g., based on determining that the second node is a failed node). For example, the first node may configure the first node as an active node for the second SRG (SRG B). As a specific example, when the first node includes the first SRG state machine data structure, the first node may cause the first SRG state machine data structure to indicate that the first node is an active node for the second SRG. Notably, the first node may continue to be configured as an active node for the first SRG (SRG A). In this way, as shown by the table in the bottom left corner of FIG. 1F, the first node may be an active node for the first SRG (SRG A) and the second SRG (SRG B), and no other node is a backup node for the first SRG or the second SRG.

As shown by reference number 140, the first node may cause second floating IP address associations to be changed (e.g., based on determining that the second node is a failed node). In some implementations, the first node may cause the second ingress floating IP address (e.g., that is associated with the second SRG) to be associated with the ingress link of the first node (e.g., along with the first ingress primary IP address and the first ingress floating IP address) and the second egress floating IP address (e.g., that is associated with the second SRG) to be associated with the egress link of the first node (e.g., along with the first egress primary IP address and the first egress floating IP address). For example, the first node may update the first SRG state machine data structure to indicate that the second ingress floating IP address is associated with the ingress link of the first node and that the second egress floating IP address is associated with the egress link of the first node. Accordingly, because the first node is (now) the active node for the second SRG, the second first ingress floating IP address may be associated with the ingress link of the first node and the second egress floating IP address may be associated with the egress link of the first node.

In this way, by performing the operations described herein in relation to FIG. 1F, the first node provides stateful high availability for the second node (e.g., for the network).

Figure 1G:
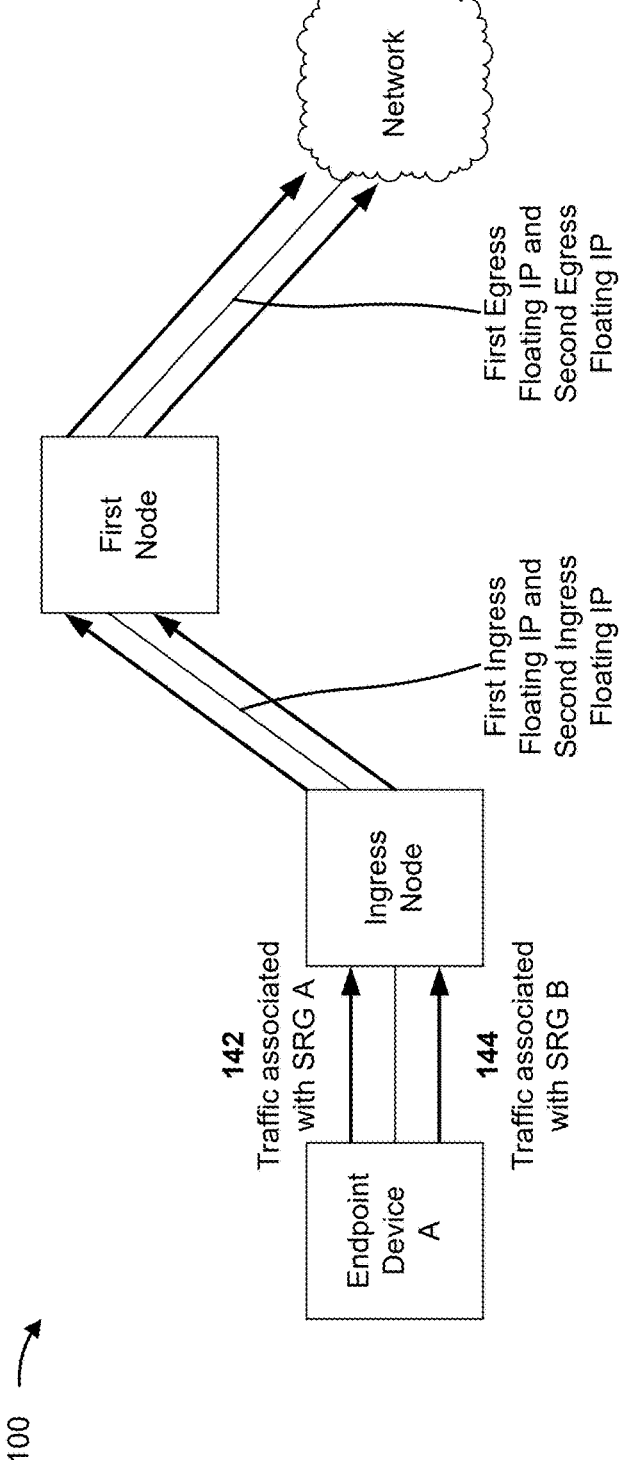
Figure 1G:
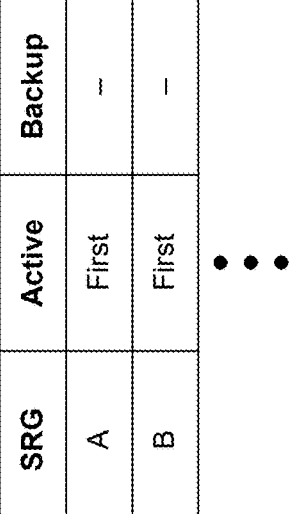

As shown by FIG. 1G, and by reference number 142, after the first node performs one or more of the operations described herein in relation to FIG. 1F, the endpoint device A may send traffic associated with the first SRG (SRG A) (e.g., that is destined for the network). Accordingly, the ingress node may receive the traffic (e.g., via an ingress link of the ingress node), determine (e.g., based on the data structure associated with the ingress node) that the traffic is to be forwarded to the first ingress floating IP address (e.g., that is associated with the first node), and may forward (e.g., via an egress link of the ingress node) the traffic to the first ingress floating IP address. The first node may thereby receive the traffic (e.g., via the ingress link of the first node) and may send at least a portion of the traffic (e.g., after performing one or more security functionalities) to the network (e.g., via the egress link of the first node).

As shown by reference number 144, after the first node performs one or more of the operations described herein in relation to FIG. 1F, the endpoint device A may send traffic associated with the second SRG (SRG B) (e.g., that is destined for the network). Accordingly, the ingress node may receive the traffic (e.g., via an ingress link of the ingress node), determine (e.g., based on the data structure associated with the ingress node) that the traffic is to be forwarded to the second ingress floating IP address (e.g., that is associated with the first node), and may forward (e.g., via an egress link of the ingress node) the traffic to the second ingress floating IP address. The first node may thereby receive the traffic (e.g., via the ingress link of the first node) because the first node is now the active node for the second SRG (and the second ingress floating IP address is associated with the ingress link of the first node). The first node may send at least a portion of the traffic (e.g., after performing one or more security functionalities) to the network (e.g., via the egress link of the first node, which is associated with the second egress floating IP address).

Figure 1H:
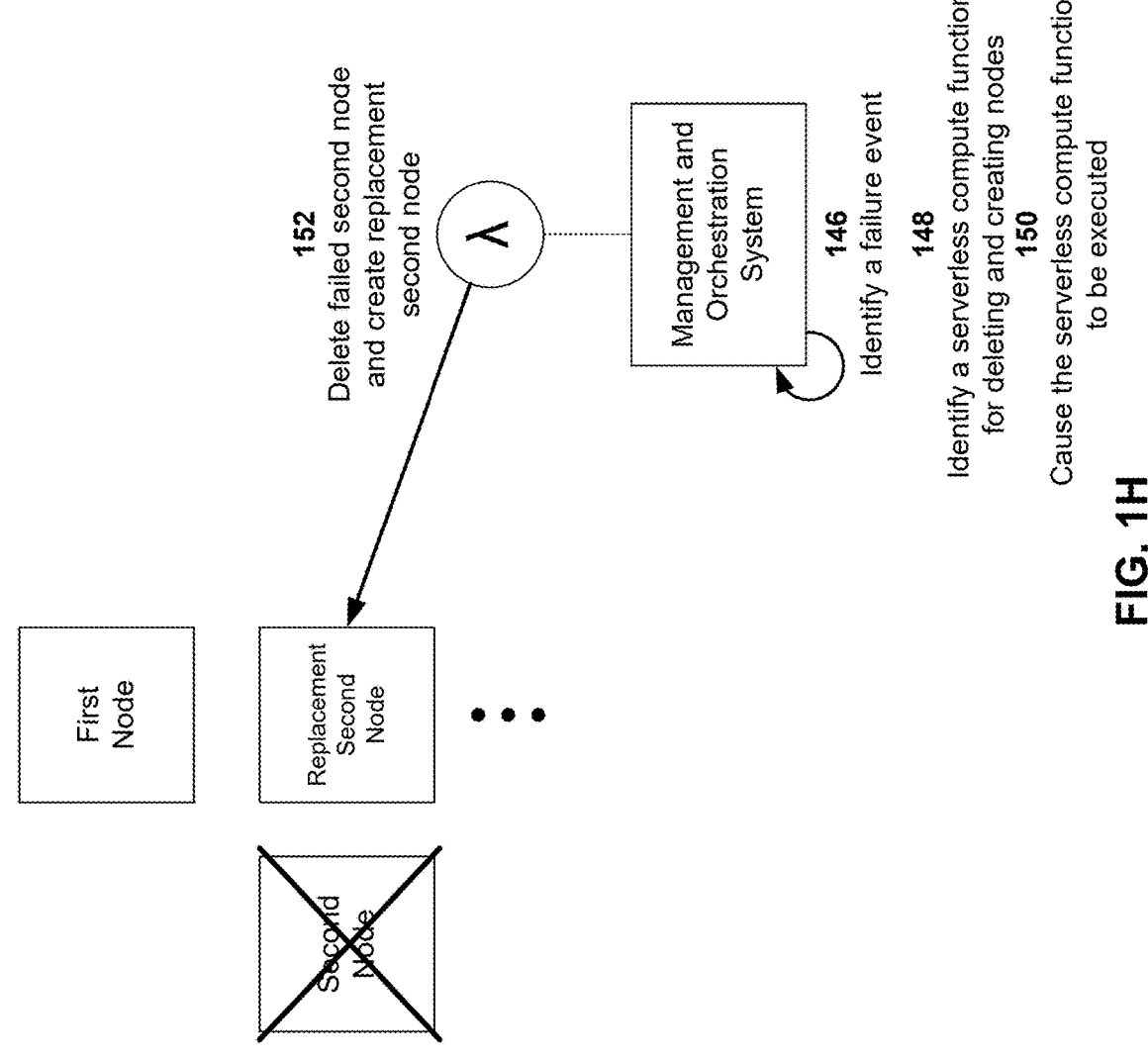

As shown in FIG. 1H, and by reference number 146, the management and orchestration system may identify a failure event. For example, the management and orchestration system may monitor the plurality of nodes or the group of nodes. Accordingly, the management and orchestration system may identify that the first node reconfigured the first node as the active node for the second SRG and/or that the first node caused the second floating IP associations to be changed (e.g., as described herein in relation to FIG. 1F and reference numbers 138 and 146). In this way, the management and orchestration system may identify a failure event associated with a failed node (e.g., the failed second node) of the group of nodes.

Accordingly, as shown by reference number 148, the management and orchestration system may identify a serverless compute function for deleting and creating nodes. For example, the management and orchestration system may identify the serverless compute function to enable deletion of the failed second node and to enable creation of a replacement second node (as further described herein).

As shown by reference number 150, the management and orchestration system may cause execution of the serverless compute function (e.g., based on identifying the serverless compute function). For example, the management and orchestration system may execute code that is associated with the serverless compute function, to cause the serverless compute function to be executed. As an alternative example, the management and orchestration system may communicate with another system or another device to cause the serverless compute function to be executed (e.g., by the other system or the other device).

As shown by reference number 152, the serverless compute function may delete the failed second node and may create a replacement second node (e.g., based on the management and orchestration system causing execution of the serverless compute function). In this way, the management and orchestration system may cause deletion of a failed node (e.g., the failed second node) and creation of a replacement node (e.g., the replacement second node) for the group of nodes.

Accordingly, the first node may identify that the replacement second node is available (e.g., as a replacement node for the second node in the group of nodes). For example, the management and orchestration system may send a message to the first node indicating that the replacement second is available.

Figure 1I:
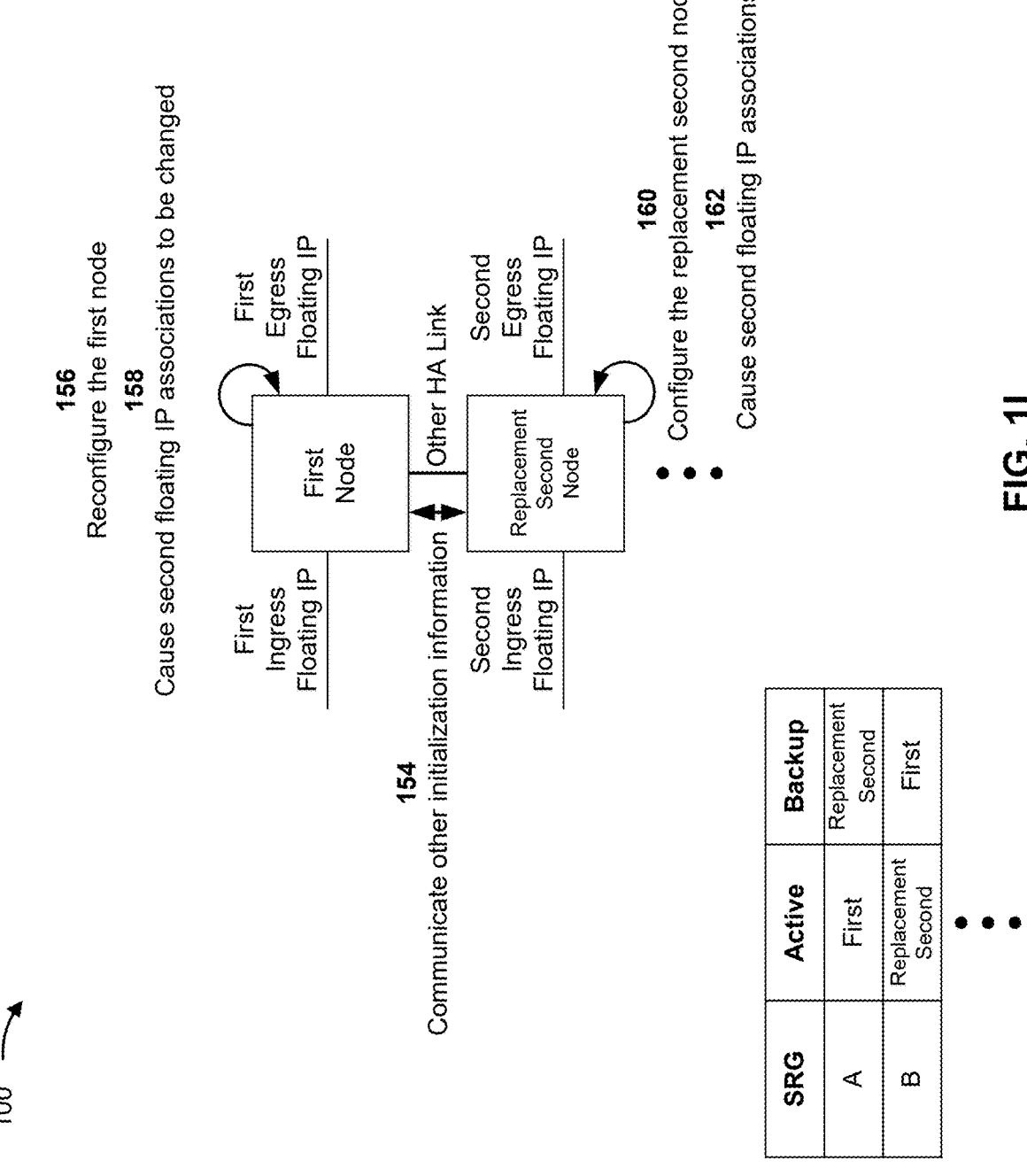

As shown in FIG. 1I, another link (hereinafter referred to as another high availability link or another HA link) may connect the first node and the replacement second node. The other high availability link may be configured to allow the first node and the replacement second node to communicate with each other (e.g., to communicate information that enables high availability of one node for the other node, as further described herein).

Accordingly, as shown by reference number 154, the first node and the replacement second node may communicate other initialization information (e.g., via the other high availability link). For example, the first node (e.g., using a state management module) may send first other initialization information to the replacement second node (e.g., via the other high availability link), and the second replacement node (e.g., using a state management module) may send second other initialization information to the first node (e.g., via the other high availability link). Communication of the other initialization information may enable the first node and the replacement second node to perform one or more other operations described herein in relation to FIG. 1I.

As shown by reference number 156, the first node may reconfigure the first node (e.g., based on communicating the other initialization information with the replacement second node). For example, the first node may configure the first node as a backup node for the second SRG (e.g., SRG B). As a specific example, when the first node includes the first SRG state machine data structure, the first node may cause the first SRG state machine data structure to indicate that the first node is a backup node for the second SRG. Notably, the first node may continue to be configured as an active node for the first SRG (SRG A).

As shown by reference number 158, the first node may cause second floating IP address associations to be changed (e.g., based on communicating the other initialization information with the replacement second node). In some implementations, the first node may cause the second ingress floating IP address (e.g., that is associated with the second SRG) to cease being associated with the ingress link of the first node and the second egress floating IP address (e.g., that is associated with the second SRG) to cease being associated with the egress link of the first node. For example, the first node may update the first SRG state machine data structure to cease indicating that the second ingress floating IP address is associated with the ingress link of the first node and to cease indicating that the second egress floating IP address is associated with the egress link of the first node.

As shown by reference number 160, the replacement second node may configure the replacement second node (e.g., based on communicating the other initialization information with the first node). For example, the replacement second node may configure the replacement second node as an active node for the second SRG (the SRG B) and as a backup node for the first SRG (the SRG A). As a specific example, the replacement second node may include a replacement second SRG state machine data structure, and the replacement second node may cause the replacement second SRG state machine data structure to indicate that the replacement second node is an active node for the second SRG and is a backup node for the first SRG.

Further, as shown by reference number 162, the replacement second node may cause second floating IP address associations with links of the replacement second node. For example, the replacement second node may have an ingress link (shown as a left link in FIG. 1I), which may be associated with a replacement second ingress primary IP address, and an egress link (shown as a right link in FIG. 1I), which may be associated with a replacement second egress primary IP address. Accordingly, the replacement second node may cause the second ingress floating IP address (e.g., that is associated with the second SRG) to be associated with the ingress link of the replacement second node (e.g., along with the replacement second ingress primary IP address) and the second egress floating IP address (e.g., that is associated with the second SRG) to be associated with the egress link of the replacement second node (e.g., along with the replacement second ingress primary IP address). For example, the replacement second node may update the replacement second SRG state machine data structure to indicate that the second ingress floating IP address is associated with the ingress link of the replacement second node and that the second egress floating IP address is associated with the egress link of the replacement second node. Accordingly, because the replacement second node is the active node for the second SRG, the second ingress floating IP address is associated with the ingress link of the replacement second node and the second egress floating IP address is associated with the egress link of the replacement second node.

In this way, as shown by the table in the bottom left corner of FIG. 1I, the first node and the replacement second node may communicate with each other such that the first node is an active node for the first SRG (SRG A) and the replacement second node is a backup node for the first SRG, and the replacement second node is an active node for the second SRG (SRG B) and the first node is a backup node for the second SRG.

Figure 1J:
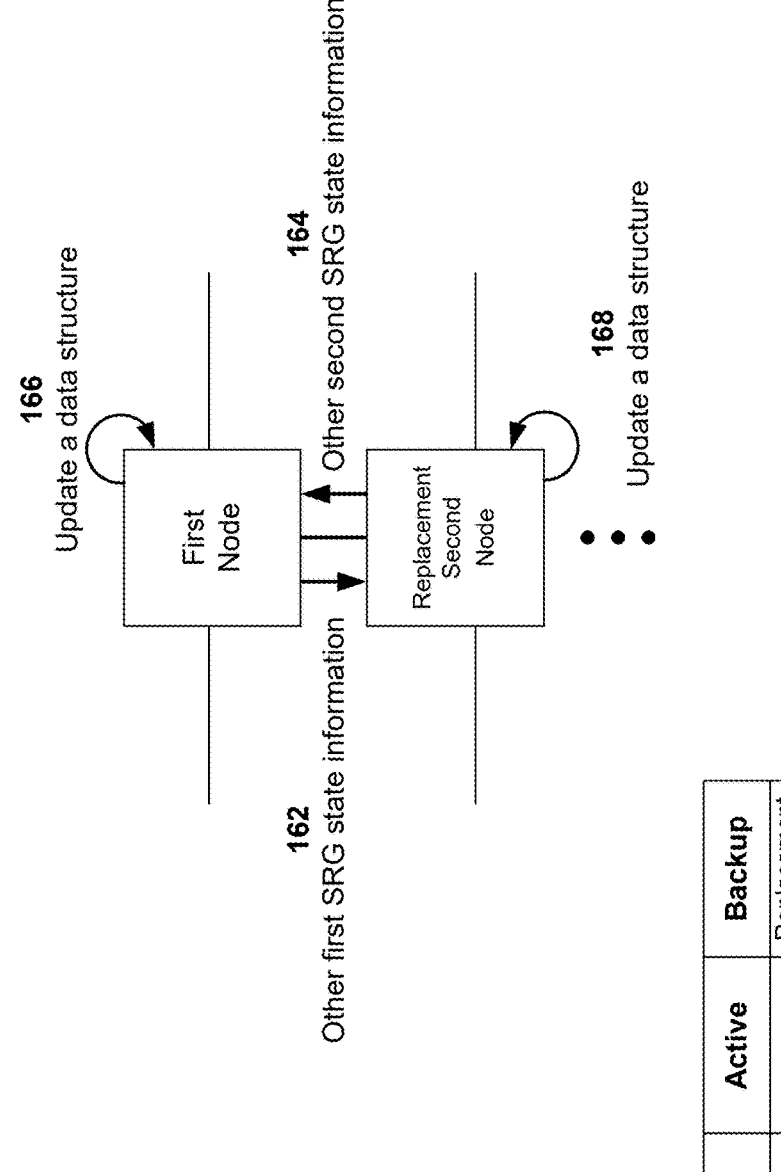

As shown in FIG. 1J, and by reference number 162, the first node (e.g., using a state management module) may send other first SRG state information associated with the first SRG. For example, the first node may send the other first SRG state information to the replacement second node via the other high availability link. The other first SRG state information may include information related to traffic (e.g., current traffic flows) associated with the first SRG that the first node is handling.

As shown by reference number 164, the replacement second node (e.g., using a state management module) may send other second SRG state information associated with the second SRG. For example, the replacement second node may send the other second SRG state information to the first node via the other high availability link. The other second SRG state information may include information related to traffic (e.g., current traffic flows) associated with the second SRG that the replacement second node is handling.

In some implementations, the first node and the replacement second node may also communicate other node health information via the other high availability link. For example, the first node may send other first health information to the replacement second node via the other high availability link. The other first health information may indicate that the first node is operating and functioning (e.g., as intended). As another example, the replacement second node may send other second health information to the first node via the other high availability link. The other second health information may indicate that the replacement second node is operating and functioning (e.g., as intended).

As shown by reference number 166, the first node (e.g., using a state management module) may update a data structure. For example, the first node may update the first SRG state machine data structure to include the other first SRG state information (e.g., to enable the first node to handle traffic associated with the first SRG as the active node for the first SRG) and the other second SRG state information (e.g., to enable the first node to handle traffic associated with the second SRG as a backup node for the second SRG).

As shown by reference number 168, the replacement second node (e.g., using a state management module) may update a data structure. For example, the replacement second node may update the replacement second SRG state machine data structure to include the other second SRG state information (e.g., to enable the replacement second node to handle traffic associated with the second SRG as the active node for the second SRG) and the other first SRG state information (e.g., to enable the replacement second node to handle traffic associated with the first SRG as a backup node for the first SRG).

Figure 1K:
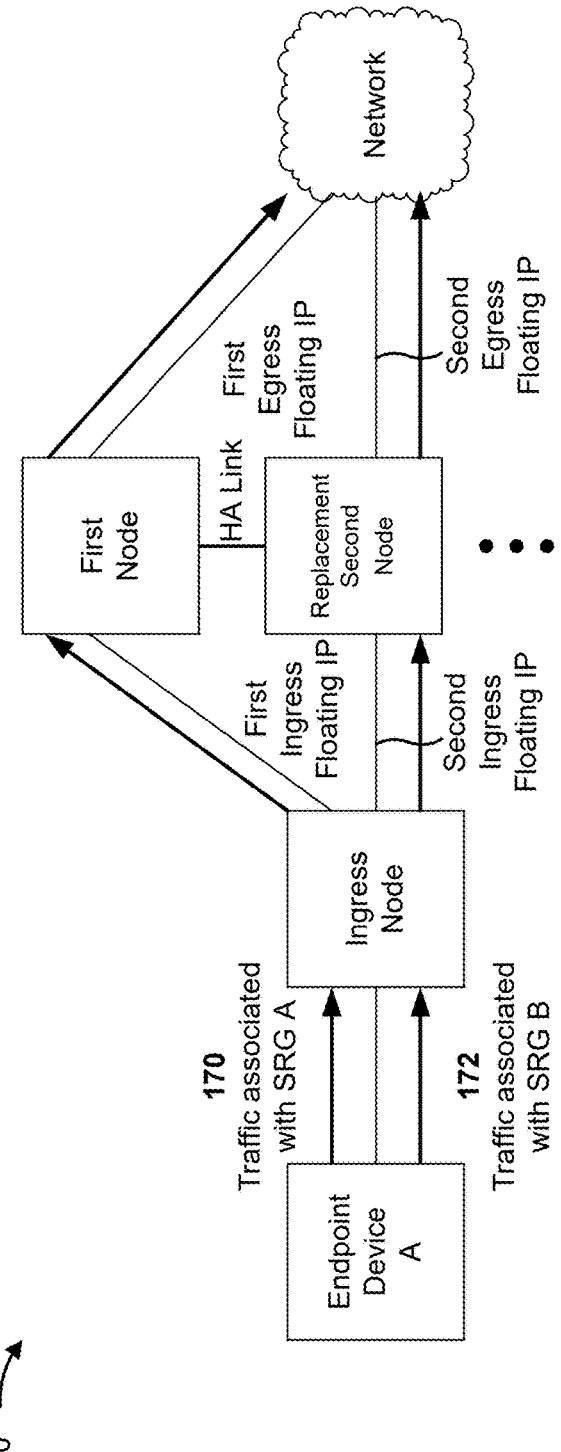

As shown by FIG. 1K, and by reference number 170, after the first node and/or the replacement second node perform(s) one or more of the operations described herein in relation to FIG. 1J, the endpoint device A may send traffic associated with the first SRG (SRG A) (e.g., that is destined for the network). Accordingly, the ingress node may receive the traffic (e.g., via an ingress link of the ingress node), determine (e.g., based on the data structure associated with the ingress node) that the traffic is to be forwarded to the first ingress floating IP address (e.g., that is associated with the first node), and may forward (e.g., via an egress link of the ingress node) the traffic to the first ingress floating IP address. The first node may thereby receive the traffic (e.g., via the ingress link of the first node) and may send at least a portion of the traffic (e.g., after performing one or more security functionalities) to the network (e.g., via the egress link of the first node).

As shown by reference number 172, after the first node and/or the replacement second node perform(s) one or more of the operations described herein in relation to FIG. 1J, the endpoint device A may send traffic associated with the second SRG (SRG B) (e.g., that is destined for the network). Accordingly, the ingress node may receive the traffic (e.g., via an ingress link of the ingress node), determine (e.g., based on the data structure associated with the ingress node) that the traffic is to be forwarded to the second ingress floating IP address (e.g., that is associated with the replacement second node), and may forward (e.g., via an egress link of the ingress node) the traffic to the second ingress floating IP address. The replacement second node may thereby receive the traffic (e.g., via the ingress link of the replacement second node) because the replacement second node is now the active node for the second SRG (and the second ingress floating IP address is associated with the ingress link of the replacement second node). The replacement second node may send at least a portion of the traffic (e.g., after performing one or more security functionalities) to the network (e.g., via the egress link of the replacement second node, which is associated with the second egress floating IP address).

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

US 12,689,550 B1

13

Figure 2:
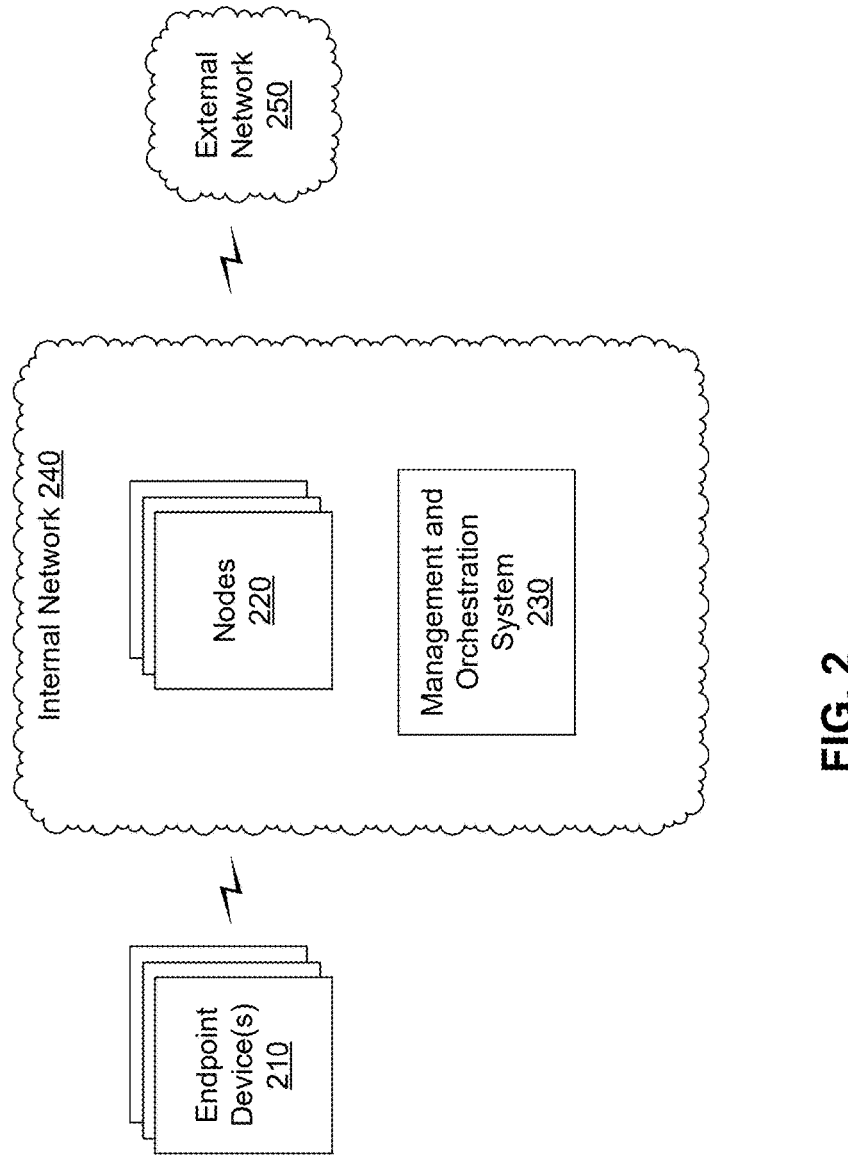
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a plurality of endpoint devices 210, a plurality of nodes 220, a management and orchestration system 230, an internal network 240, and an external network 250. Devices of environment 200 may interconnect via wired connections, wireless connections, or a combination of wired and wireless connections.

Endpoint device 210 includes one or more devices capable of providing and/or receiving traffic. For example, endpoint device 210 may include a router, a gateway, a switch, a firewall, a hub, a bridge, a reverse proxy, a server (e.g., a proxy server), a security device, an intrusion detection device, a load balancer, or a similar type of device. As another example, endpoint device 210 may include a subscriber device (e.g., a residential gateway (RG), customer premises equipment (CPE), or another type of device) associated with a tenant of internal network 240, a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. Endpoint device 210 may provide traffic to other devices via internal network 240 (e.g., by using node(s) 220 as an intermediary), such as devices that are external to internal network 240.

Node 220 includes one or more devices capable of receiving, processing, storing, routing, and/or providing traffic in a manner described herein. For example, node 220 may include a router, such as a label switching router (LSR), a label edge router (LER), an ingress router, an egress router, a provider router (e.g., a provider edge router, a provider core router, etc.), a virtual router, or another type of router. Additionally, or alternatively, node 220 may include a gateway, a switch, a firewall, a hub, a bridge, a reverse proxy, a server (e.g., a proxy server, a cloud server, a data center server, etc.), a load balancer, and/or a similar device. Node 220 may be an ingress node, a security node, or another type of node. In some implementations, node 220 may be a physical device implemented within a housing, such as a chassis. In some implementations, node 220 may be a virtual device implemented by one or more computer devices of a cloud computing environment or a data center.

Management and orchestration system 230 may include one or more devices capable of receiving, generating, storing, processing, providing, and/or routing information, as described elsewhere herein. Management and orchestration system 230 may include a communication device and/or a computing device. For example, management and orchestration system 230 may include a server, such as an application server, a client server, a web server, a database server, a host server, a proxy server, a virtual server (e.g., executing on computing hardware), or a server in a cloud computing system. In some implementations, management and orchestration system 230 may be a physical device implemented within a housing, such as a chassis. In some implementations, management and orchestration system 230 may be a virtual device implemented by one or more computer devices of a cloud computing environment or a data center. In some implementations, management and orchestration system 230 may be a microservice, or other type of application, that is associated with internal network 240.

The internal network 240 may include one or more wired and/or wireless networks. For example, the internal network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, and/or a combination of these or other types of networks. The internal network 240 enables communication among the devices of environment 200.

The external network 250 includes one or more wired and/or wireless data networks. For example, the external network 250 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

Figure 3:
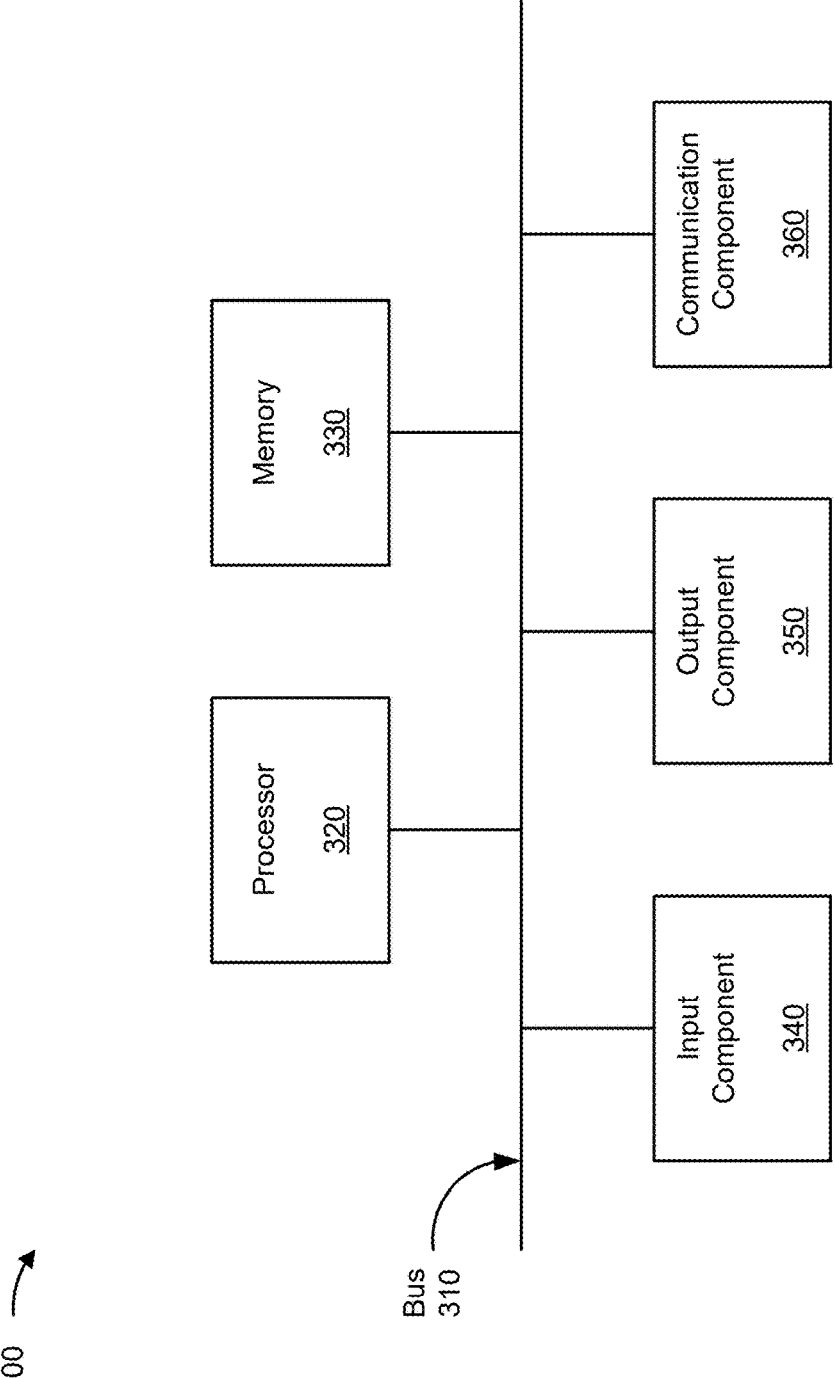
FIG. 3 is a diagram of example components of a device associated with stateful multi-node high availability.

FIG. 3 is a diagram of example components of a device 300 associated with stateful multi-node high availability. The device 300 may correspond to endpoint device 210, node 220, and/or management and orchestration system 230. In some implementations, endpoint device 210, node 220, and/or management and orchestration system 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
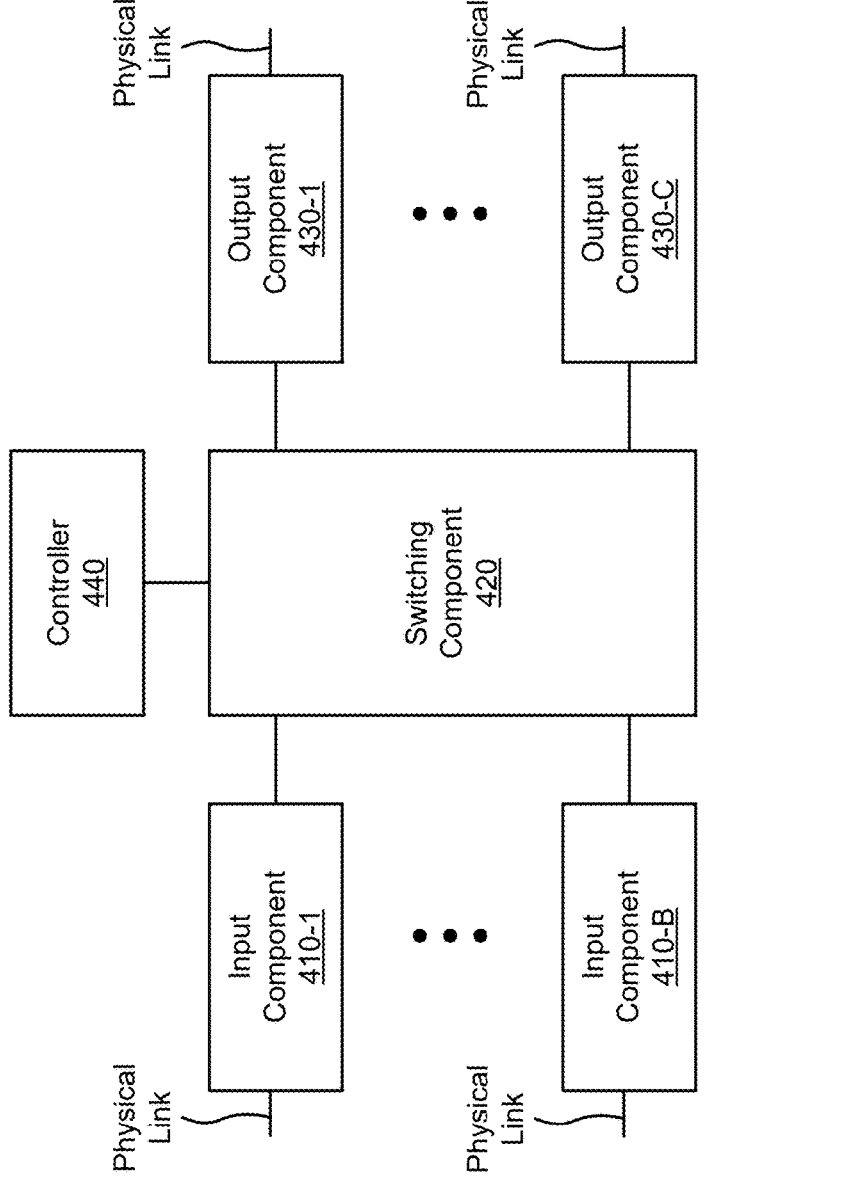
FIG. 4 is a diagram of example components of a device associated with stateful multi-node high availability.

FIG. 4 is a diagram of example components of a device 400 associated with stateful multi-node high availability. Device 400 may correspond to endpoint device 210, node 220, and/or management and orchestration system 230. In some implementations, endpoint device 210, node 220, and/or management and orchestration system 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
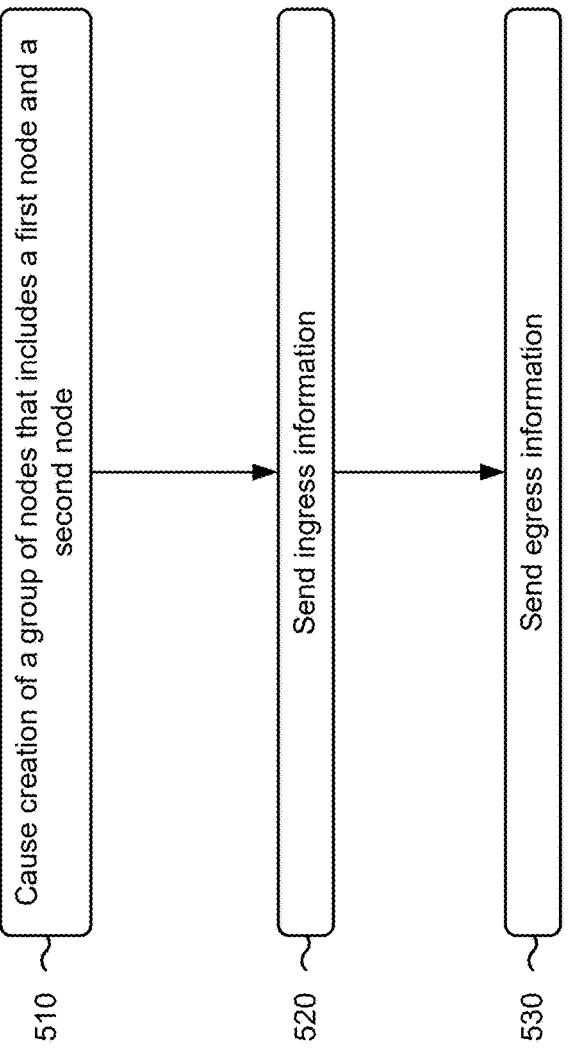
FIG. 5 is a flowchart of an example process associated with stateful multi-node high availability.

FIG. 5 is a flowchart of an example process 500 associated with stateful multi-node high availability. In some implementations, one or more process blocks of FIG. 5 are performed by a system (e.g., management and orchestration system 230). In some implementations, one or more process blocks of FIG. 5 are performed by another device or a group of devices separate from or including the system, such as an endpoint device (e.g., endpoint device 210) and/or a node (e.g., node 220). Additionally, or alternatively, one or more process blocks of FIG. 5 may be performed by one or more components of device 300, such as processor 320, memory 330, input component 340, output component 350, and/or communication component 360; of device 400, such as input component 410, switching component 420, output component 430, and/or controller 440; and/or of another device.

As shown in FIG. 5, process 500 may include causing creation of a group of nodes that includes a first node and a second node (block 510). For example, the system may cause creation of a group of nodes that includes a first node and a second node, as described above. In some implementations, the first node is configured with a first ingress floating IP address associated with an ingress link of the first node and a first egress floating IP address associated with an egress link of the first node, and the second node is configured with a second ingress floating IP address associated with an ingress link of the second node and a second egress floating IP address associated with an egress link of the second node. In some implementations, the first node is configured as an active node for a first SRG and as a backup node for a second SRG, and the second node is configured as a backup node for the first SRG and as an active node for the second SRG.

As further shown in FIG. 5, process 500 may include sending ingress information (block 520). For example, the system may send ingress information, as described above. In some implementations, the ingress information indicates that the first ingress floating IP address is associated with the first SRG and that the second ingress floating IP address is associated with the second SRG.

As further shown in FIG. 5, process 500 may include sending egress information (block 530). For example, the system may send egress information, as described above. In some implementations, the egress information indicates that the first egress floating IP address is associated with the first SRG and that the second egress floating IP address is associated with the second SRG.

Process 500 may include additional implementations, such as any single implementation or any combination of implementations described below and/or in connection with one or more other processes described elsewhere herein.

In a first implementation, causing the creation of the group of nodes comprises identifying a serverless compute function for creating nodes, and causing execution of the serverless compute function.

In a second implementation, alone or in combination with the first implementation, sending the ingress information comprises sending the ingress information to an ingress node, wherein sending the ingress information to the ingress node allows the ingress node to register the first ingress floating IP address as associated with the first SRG and the second ingress floating IP address as associated with the second SRG.

In a third implementation, alone or in combination with one or more of the first and second implementations, sending the egress information comprises sending the egress information to an endpoint device, wherein sending the egress information to the endpoint device allows the endpoint device to register the first egress floating IP address as associated with the first SRG and the second egress floating IP address as associated with the second SRG.

In a fourth implementation, alone or in combination with one or more of the first through third implementations, process 500 includes identifying a failure event associated with a failed node of the group of nodes, and causing deletion of the failed node and creation of a replacement node for the group of nodes.

In a fifth implementation, alone or in combination with one or more of the first through fourth implementations, causing the deletion of the failed node and the creation of the replacement node for the group of nodes comprises identifying a serverless compute function for deleting and creating nodes, and causing the serverless compute function to be executed.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 associated with stateful multi-node high availability. In some implementations, one or more process blocks of FIG. 6 are performed by a first node (e.g., a first node 220). In some implementations, one or more process blocks of FIG. 6 are performed by another device or a group of devices separate from or including the first node, such as an endpoint device (e.g., endpoint device 210), a second node (e.g., a second node 220) and/or a system (e.g., management and orchestration system 230). Additionally, or alternatively, one or more process blocks of FIG. 6 may be performed by one or more components of device 300, such as processor 320, memory 330, input component 340, output component 350, and/or communication component 360; of device 400, such as input component 410, switching component 420, output component 430, and/or controller 440; and/or of another device.

As shown in FIG. 6, process 600 may include communicating, via a high availability link, initialization information with a second node (block 610). For example, the first node may communicate, via a high availability link, initialization information with a second node, as described above.

As further shown in FIG. 6, process 600 may include configuring the first node as an active node for a first SRG and as a backup node for a second SRG (block 620). For example, the first node may configure, based on communicating the initialization information with the second node, the first node as an active node for a first SRG and as a backup node for a second SRG, as described above.

As further shown in FIG. 6, process 600 may include causing a first ingress floating IP address to be associated with an ingress link of the first node and a first egress floating IP address to be associated with an egress link of the first node (block 630). For example, the first node may cause, based on communicating the initialization information with the second node, a first ingress floating IP address to be associated with an ingress link of the first node and a first egress floating IP address to be associated with an egress link of the first node, as described above. In some implementations, the first ingress floating IP address is associated with the first SRG and the first egress floating IP address is associated with the first SRG.

As further shown in FIG. 6, process 600 may include sending, via the high availability link, first SRG state information associated with the first SRG to the second node (block 640). For example, the first node may send, via the high availability link, first SRG state information associated with the first SRG to the second node, as described above.

As further shown in FIG. 6, process 600 may include receiving, via the high availability link, second SRG state information associated with the second SRG from the second node (block 650). For example, the first node may receive, via the high availability link, second SRG state information associated with the second SRG from the second node, as described above.

As further shown in FIG. 6, process 600 may include updating a data structure based on the first SRG state information and the second SRG state information (block 660). For example, the first node may update a data structure based on the first SRG state information and the second SRG state information, as described above.

Process 600 may include additional implementations, such as any single implementation or any combination of implementations described below and/or in connection with one or more other processes described elsewhere herein.

In a first implementation, process 600 includes receiving, via the ingress link, traffic associated with the first SRG, and sending, via the egress link, at least a portion of the traffic associated with the first SRG.

In a second implementation, alone or in combination with the first implementation, process 600 includes communicating, via the high availability link, node health information with the second node; determining, based on communicating the node health information with the second node, that the second node is a failed node; configuring, based on determining that the second node is a failed node, the first node as an active node for the second SRG; and causing, based on determining that the second node is a failed node, a second ingress floating IP address to be associated with the ingress link of the first node and a second egress floating IP address to be associated with the egress link of the first node, wherein the second ingress floating IP address is associated with the second SRG and the second egress floating IP address is associated with the second SRG.

In a third implementation, alone or in combination with one or more of the first and second implementations, process 600 includes receiving, via the ingress link, traffic associated with the first SRG and the second SRG, and sending, via the egress link, at least a portion of the traffic associated with the first SRG and the second SRG.

In a fourth implementation, alone or in combination with one or more of the first through third implementations, process 600 includes identifying, after determining that the second node is a failed node, that a replacement second node is available; communicating, via another high availability link, other initialization information with the replacement second node; configuring, based on communicating the other initialization information with the replacement second node, the first node as a backup node for the second SRG; and causing, based on communicating the other initialization information with the replacement second node, the second ingress floating IP address to cease being associated with the ingress link of the first node and the second egress floating IP address to cease being associated with the egress link of the first node.

In a fifth implementation, alone or in combination with one or more of the first through fourth implementations, process 600 includes sending, via the other high availability link, other first SRG state information associated with the first SRG to the replacement second node; receiving, via the other high availability link, other second SRG state information associated with the second SRG from the replacement second node; and updating the data structure based on the other first SRG state information and the other second SRG state information.

In a sixth implementation, alone or in combination with one or more of the first through fifth implementations, process 600 includes receiving, via the ingress link, traffic associated with the first SRG, and sending, via the egress link, at least a portion of the traffic associated with the first SRG.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A processor-implemented method, comprising:
    causing, by a system, creation of a group of nodes that includes a first node and a second node,
        wherein the first node is configured with a first ingress floating Internet protocol (IP) address associated with an ingress link of the first node and a first egress floating IP address associated with an egress link of the first node, and the second node is configured with a second ingress floating IP address associated with an ingress link of the second node and a second egress floating IP address associated with an egress link of the second node, and wherein the first node is configured as an active node for a first service redundancy group (SRG) and as a backup node for a second SRG, and the second node is configured as a backup node for the first SRG and as an active node for the second SRG;
    sending, by the system, ingress information that indicates that the first ingress floating IP address is associated with the first SRG and that the second ingress floating IP address is associated with the second SRG; and
    sending, by the system, egress information that indicates that the first egress floating IP address is associated with the first SRG and that the second egress floating IP address is associated with the second SRG.

2. The processor-implemented method of claim 1, wherein causing the creation of the group of nodes comprises:
    identifying a serverless compute function for creating nodes; and
    causing execution of the serverless compute function.

3. The processor-implemented method of claim 1, wherein sending the ingress information comprises:
    sending the ingress information to an ingress node,
        wherein sending the ingress information to the ingress node allows the ingress node to register the first ingress floating IP address as associated with the first SRG and the second ingress floating IP address as associated with the second SRG.

4. The processor-implemented method of claim 1, wherein sending the egress information comprises:
    sending the egress information to an endpoint device,
        wherein sending the egress information to the endpoint device allows the endpoint device to register the first egress floating IP address as associated with the first SRG and the second egress floating IP address as associated with the second SRG.

5. The processor-implemented method of claim 1, further comprising:
    identifying a failure event associated with a failed node of the group of nodes; and
    causing deletion of the failed node and creation of a replacement node for the group of nodes.

6. The processor-implemented method of claim 5, wherein causing the deletion of the failed node and the creation of the replacement node for the group of nodes comprises:
    identifying a serverless compute function for deleting and creating nodes; and
    causing the serverless compute function to be executed.

7. A first node, comprising:
    one or more memories; and
    one or more processors to:
        communicate, via a high availability link, initialization information with a second node;
        configure, based on communicating the initialization information with the second node, the first node as an active node for a first service redundancy group (SRG) and as a backup node for a second SRG;
        cause, based on communicating the initialization information with the second node, a first ingress floating Internet protocol (IP) address to be associated with an ingress link of the first node and a first egress floating IP address to be associated with an egress link of the first node,
            wherein the first ingress floating IP address is associated with the first SRG and the first egress floating IP address is associated with the first SRG;

send, via the high availability link, first SRG state information associated with the first SRG to the second node;

receive, via the high availability link, second SRG state information associated with the second SRG from the second node; and update a data structure based on the first SRG state information and the second SRG state information.

8. The first node of claim 7, wherein the one or more processors are further to:

receive, via the ingress link, traffic associated with the first SRG; and send, via the egress link, at least a portion of the traffic associated with the first SRG.

9. The first node of claim 7, wherein the one or more processors are further to:

communicate, via the high availability link, node health information with the second node;

determine, based on communicating the node health information with the second node, that the second node is a failed node;

configure, based on determining that the second node is a failed node, the first node as an active node for the second SRG; and cause, based on determining that the second node is a failed node, a second ingress floating IP address to be associated with the ingress link of the first node and a second egress floating IP address to be associated with the egress link of the first node, wherein the second ingress floating IP address is associated with the second SRG and the second egress floating IP address is associated with the second SRG.

10. The first node of claim 9, wherein the one or more processors are further to:

receive, via the ingress link, traffic associated with the first SRG and the second SRG; and send, via the egress link, at least a portion of the traffic associated with the first SRG and the second SRG.

11. The first node of claim 9, wherein the one or more processors are further to:

identify, after determining that the second node is a failed node, that a replacement second node is available;

communicate, via another high availability link, other initialization information with the replacement second node;

configure, based on communicating the other initialization information with the replacement second node, the first node as a backup node for the second SRG; and cause, based on communicating the other initialization information with the replacement second node, the second ingress floating IP address to cease being associated with the ingress link of the first node and the second egress floating IP address to cease being associated with the egress link of the first node.

12. The first node of claim 11, wherein the one or more processors are further to:

send, via the other high availability link, other first SRG state information associated with the first SRG to the replacement second node;

receive, via the other high availability link, other second SRG state information associated with the second SRG from the replacement second node; and update the data structure based on the other first SRG state information and the other second SRG state information.

13. The first node of claim 11, wherein the one or more processors are further to:

receive, via the ingress link, traffic associated with the first SRG; and send, via the egress link, at least a portion of the traffic associated with the first SRG.

14. A non-transitory computer-readable medium storing a set of instructions, the set of instructions comprising:

one or more instructions that, when executed by one or more processors of a first node, cause the first node to:

configure the first node as an active node for a first service redundancy group (SRG) and as a backup node for a second SRG; and cause a first ingress floating Internet protocol (IP) address to be associated with an ingress link of the first node and a first egress floating IP address to be associated with an egress link of the first node, wherein the first ingress floating IP address is associated with the first SRG and the first egress floating IP address is associated with the first SRG.

15. The non-transitory computer-readable medium of claim 14, wherein the one or more instructions, when executed by the one or more processors, further cause the first node to:

send, via a high availability link, first SRG state information associated with the first SRG to a second node; and receive, via the high availability link, second SRG state information associated with the second SRG from the second node.

16. The non-transitory computer-readable medium of claim 14, wherein the one or more instructions, when executed by the one or more processors, further cause the first node to:

receive, via the ingress link, traffic associated with the first SRG; and send, via the egress link, at least a portion of the traffic associated with the first SRG.

17. The non-transitory computer-readable medium of claim 14, wherein the one or more instructions, when executed by the one or more processors, further cause the first node to:

determine that a second node is a failed node, wherein the second node is an active node for the second SRG;

configure, based on determining that the second node is a failed node, the first node as an active node for the second SRG; and cause, based on determining that the second node is a failed node, a second ingress floating IP address to be associated with the ingress link of the first node and a second egress floating IP address to be associated with the egress link of the first node, wherein the second ingress floating IP address is associated with the second SRG and the second egress floating IP address is associated with the second SRG.

18. The non-transitory computer-readable medium of claim 17, wherein the one or more instructions, when executed by the one or more processors, further cause the first node to:

receive, via the ingress link, traffic associated with the first SRG and the second SRG; and send, via the egress link, at least a portion of the traffic associated with the first SRG and the second SRG.

19. The non-transitory computer-readable medium of claim 17, wherein the one or more instructions, when executed by the one or more processors, further cause the first node to:

identify, after determining that the second node is a failed node, that a replacement second node is available;

configure, based on identifying that the replacement second node is available, the first node as a backup node for the second SRG; and cause, based on identifying that the replacement second node is available, the second ingress floating IP address to cease being associated with the ingress link of the first node and the second egress floating IP address to cease being associated with the egress link of the first node.

20. The non-transitory computer-readable medium of claim 19, wherein the one or more instructions, when executed by the one or more processors, further cause the first node to:

receive, via the ingress link, traffic associated with the first SRG; and send, via the egress link, at least a portion of the traffic associated with the first SRG.

\* \* \* \* \*